United States Patent [19]

Sugiyama et al.

[11] Patent Number: 4,547,871
[45] Date of Patent: Oct. 15, 1985

[54] TWO DIMENSIONAL ACTUATOR FOR MOVING OPTICAL MEDIUM OF SCANNING DEVICE

[75] Inventors: Toshio Sugiyama, Toyokawa; Yoshio Yamane, Yokohama, both of Japan

[73] Assignee: Hitachi, Ltd., Tokyo, Japan

[21] Appl. No.: 340,701

[22] Filed: Jan. 19, 1982

[30] Foreign Application Priority Data

Jan. 26, 1981 [JP] Japan .................. 56-8471[U]

[51] Int. Cl.⁴ .................................. G11B 7/00
[52] U.S. Cl. .................... 369/44; 250/201 DF; 369/45
[58] Field of Search .................. 369/44–46; 358/342; 250/201, 201 DF

[56] References Cited

U.S. PATENT DOCUMENTS 4,092,529  5/1978  Aihara et al. .................. 369/45
4,302,830  11/1981  Hamaoka ........................ 369/45
4,321,701  3/1982  Arguie et al. .................. 369/45

FOREIGN PATENT DOCUMENTS 56-119944  9/1981  Japan ........................ 369/45

Primary Examiner—Robert L. Richardson
Attorney, Agent, or Firm—Antonelli, Terry & Wands

[57] ABSTRACT

An optical scanning device for subjecting a light spot to a focussing operation and for causing the light spot to perform a tracking operation to reproduce information stored in a video or audio disc is disclosed in which a coil controlling a focussing optical system for forming the light spot and another coil causing the light spot to track the above-mentioned information are both placed in a magnetic gap included in a magnetic circuit formed by a permanent magnet and a magnetic member, and the magnetic circuit is arranged in a direction perpendicular to the direction of the tracking operation.

19 Claims, 5 Drawing Figures

TWO DIMENSIONAL ACTUATOR FOR MOVING OPTICAL MEDIUM OF SCANNING DEVICE

The present invention relates to a scanning device for an optical system, and, more particularly, to a scanning device for an optical system used in a video disc apparatus, a PCM audio disc apparatus and others.

In scanning devices of this kind, it is necessary to perform a focussing operation (in the direction of an optical axis) so that a light beam is focussed accurately on an information storing medium (namely, a disc), and it is also necessary to perform a tracking operation (in a direction perpendicular to the optical axis) so that a light spot which is formed by focussing the light beam on the disc, accurately follows an information track on the disc. Various optical scanning devices for performing the above-mentioned operations have been proposed. For example, a driving device has been known which can drive a focussing lens for focussing a light beam on a disc in two directions. However, this driving device cannot reproduce information stored in an inner circular portion of a small-sized disc such as a PCM audio disc, since the driving device is large in size. In a PCM audio disc, it is necessary to reproduce information stored in a circular portion having a radius of 25 mm. A motor which can give a well-controlled rotation to a disc of this kind, that is, a motor which does not introduce irregularities in rotation of the disc, is required to have an outer diameter of at least about 30 mm. Accordingly, an actuator for an optical system is subject to a dimensional restriction that the width of the actuator is equal to or less than 20 mm.

Further, the conventional driving device has a drawback that a lead wire of a driving coil generally breaks from fatigue since the lead wire is moved in accordance with a coil part when the coil part is operated.

Furthermore, in the conventional driving device, driving means for focussing operation and driving means for tracking operation are arranged separately from each other, and therefore the number of parts is large. This deteriorates the operation characteristic of the driving device.

It is accordingly an object of the present invention to provide an optical scanning device which has relatively few parts, is of a small size, and has a long service life.

A feature of the present invention which can attain the above object, resides in that both of a driving coil for focussing operation and a driving coil for tracking operation are arranged in one magnetic gap.

Another feature of the present invention resides in that these driving coils and an optical system are supported by four conductive suspensions.

Now, the present invention will be explained below with reference to the accompanying drawings, in which.

Figure 1:
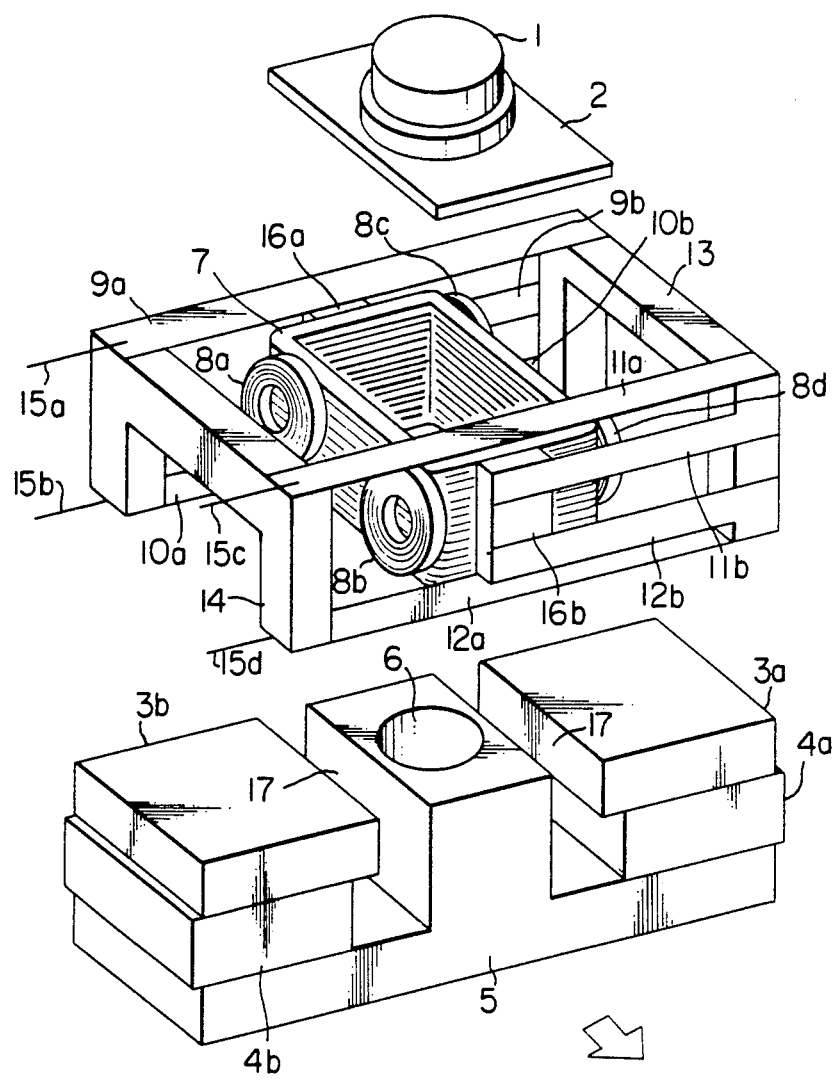
FIG. 1 is an exploded, perspective view showing an embodiment of an optical scanning device according to the present invention.
Figure 2:
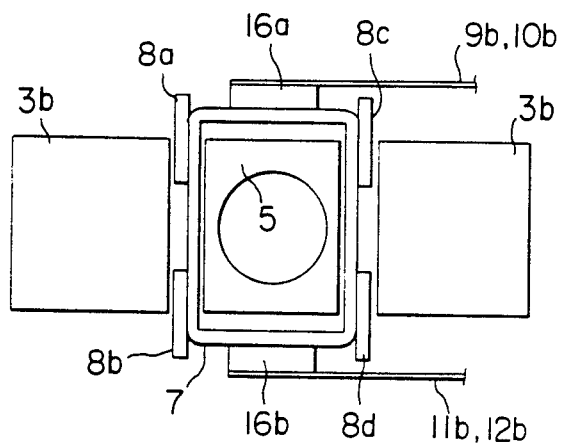
FIG. 2 is a plan view of the embodiment shown in FIG. 1.

Referring to FIG. 1, an optical scanning device according to the present invention includes an optical system 1 for focussing a light beam from a light source (not shown) on a recording medium (namely, a disc), with the optical system 1 being fixed through a holder 2 to an upper portion of a coil group including coils 7 and 8a through 8d. The coil group is disposed in a magnetic gap 17 which is formed by two permanent magnets 4a and 4b and magnetic members 3a, 3b and 5. The magnetic member 5 has, at a central portion thereof, a through hole 6 for allowing a light beam to pass through the member 5. Further, the magnetic gap 17 is arranged in parallel to the direction of tracking operation. Accordingly, a motor for rotating the disc is placed on a line extending in the direction as indicated with an arrow. A focussing operation is carried out in the following manner. A driving coil 7 is made in the form of a hollow cylinder having a rectangular cross section. As seen in FIG. 2, a large gap is provided between the coil 7 and the magnetic member 5 so that the coil 7 can move in the direction of tracking operation and moreover the stroke of tracking operation can be made large. Four focussing plate springs 9a, 10a, 11a and 12a are fixed to a focussing-spring supporting member 14 fixed to a body (not shown). The four focussing plate springs are deformed by passing an electric current through the coil 7. At this time, an intermediate movable member 13, tracking plate springs 9b, 10b, 11b and 12b, and members 16a and 16b for fixing the tracking plate springs to the coil group are displaced in the direction of focussing operation. When the focussing operation is performed, the tracking plate springs 9b, 10b, 11b and 12b are not subjected to any deformation since these springs have a large rigidity in the direction of focussing operation, and therefore the intermediate movable member 13 is displaced together with the coil group.

Figure 3A:
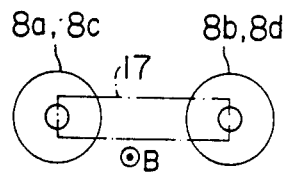
FIGS. 3a, 3b and 3c are views for explaining the operation of the embodiment shown in FIGS. 1 and 2.
Figure 3B:
Figure 3C:
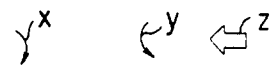

As shown in FIGS. 3a, 3b and 3c, the tracking operation is performed by four driving coils 8a, 8b, 8c and 8d for tracking operation, which are fixed to the outside of the driving coil 7. As shown in FIG. 3a, the driving coils 8a, 8b, 8c and 8d are fixed to the coil 7 in such a manner that only a portion, of each of the driving coils 8a, 8b, 8c and 8d is placed in the magnetic gap 17. Accordingly, when an electric current flows through the coils 8a and 8c in the direction indicated by the arrow α and flows through the coils 8b and 8d in the direction indicated by the arrow β, as shown in FIG. 3b, the coil group is moved in the direction indicated by the arrow γ when the magnetic flux B exists in the direction as shown in FIG. 3a. On the other hand, when an electric current flows through the coils 8a and 8b in the direction indicated by the arrow X and flows through the coils 8b and 8d in the direction indicated by the arrow Y, as shown in FIG. 3c, the coil group is moved in the direction indicated by the arrow Z. In the tracking operation, the intermediate movable member 13 is not operated (that is, does not move) since each of the focussing plate springs 9a, 10a, 11a and 12a has a large rigidity in the direction of tracking operation, but the tracking plate springs 9b, 10b, 11b and 12b are deformed. Thus, only the coil group is operated in the direction of tracking operation.

As is evident from the above-mentioned explanation on the operation of the embodiment, according to the present invention, it is possible to perform both of the focussing and tracking operations using only a magnetic gap arranged in parallel to the direction of tracking operation. Therefore, the number of parts required to form a static magnetic field is small, and thus a small-sized optical scanning device can be obtained. Further, in the present embodiment, the plate springs are made of a conductive metal, each of four pairs of plate springs 9a and 9b, 10a and 10b, 11a and 11b, and 12a and 12b are united in a body, and the intermediate movable member is made of an insulating material to electrically isolate these pairs from each other. Therefore, the plate springs can be used as lead wires for causing a focussing current and a tracking current to flow. A conventional moving coil has a serious drawback that lead wires of the moving coil are broken from fatigue since the lead wires are deformed in accordance with the operation of a movable portion, and another drawback that the presence of the lead wires exerts an unfavorable influence upon the operation of the movable portion. On the other hand, the above-mentioned structure of the embodiment can provide longer service life, since no lead wire is required. Incidentally, reference numerals 15a, 15b, 15c and 15d in FIG. 1 designate wires for connecting the present embodiment to a driving circuit.

Further, according to the present invention, a width of an optical scanning device in the direction of tracking operation can be made equal to or less than one-half that of a conventional optical scanning system capable of moving in two directions.

What we claim is:

1. An optical scanning system for subjecting a light spot for tracking information on a predetermined recording medium to a focussing and tracking operation, the optical scanning device comprising:

magnetic members for forming at least one magnetic gap extending substantially in a direction of the tracking operation and for generating magnetic flux in the magnetic gap in a direction extending substantially at right angles to both the direction of the focusing operation and the direction of the tracking operation;

driving coil means including first coil means and second coil means driven independent of each other for respectively performing the focusing operation and the tracking operation, both of said first and second driving coil means being placed in a manner such that a portion of each of said first and second coil means are linked by said magnetic flux in said magnetic gap;

said magnetic members including a first magnetic member, a second magnetic member, and a third magnetic member arranged with respect to one another in a direction substantially at right angles to the directions of said focussing and tracking operations and a pair of magnets respectively connected with both said first and second magnetic members and said second and third magnetic members for generating magnetic flux in the magnetic gaps formed between the first and second magnetic members and between the second and third magnetic members; and said first coil means is arranged around said second magnetic member to pass through said magnetic gaps.

2. An optical scanning system according to claim 1, wherein said second coil means includes a plurality of coils which are supported on said first coil means so that a portion of each of said plurality of coils is linked with said magnetic flux.

3. An optical scanning system according to claim 1, wherein said second magnetic member includes a passage means for enabling a passing therethrough of a light beam forming the light spot.

4. An optical scanning system for subjecting a light spot for tracking information on a predetermined recording medium to a focussing operation and a tracking operation, the optical scanning system comprising:

a movable member;

a first supporting member for supporting said movable member on a stationary member so that said movable member is movable in a first direction relative to said stationary member;

second supporting means for supporting said movable member so as to be movable in a second direction;

an optical system supported on said movable member for focussing the light spot on the recording medium;

magnetic means for forming at least one magnetic gap extending substantially in both the first and second directions and for generating magnetic flux in a direction extending at a right angle to said first and second directions; and independently driven first and second coil means supported at the optical system in such a manner that a portion of each of the first and second coil means is linked with the magnetic flux whereby the optical system is moved in a direction in which the focussing operation is performed when the first coil means is driven and in another direction when said tracking operation is performed when said second coil means is driven, said first coil means including a focussing coil which is wound in a plane which is substantially perpendicular to the direction of focussing.

5. An optical scanning system according to claim 4, wherein said first supporting means includes at least one plate spring deformable in said first direction.

6. An optical scanning system according to claim 5, wherein said second supporting means includes at least one plate spring deformable in said second direction.

7. An optical scanning system according to claim 5, wherein said first supporting means includes two pair of plate springs disposed in opposition to each other.

8. An optical scanning system according to claim 6, wherein said second supporting means includes two pair of plate springs disposed in opposition to each other.

9. An optical scanning system according to claim 5, wherein said first and second supporting means are made of a conductive material through which electric current is supplied to said first and second coil means.

10. An optical scanning system according to claim 4, wherein said magnetic means includes a first magnetic member, a second magnetic member, and a third magnetic member arranged with respect to one another in a direction substantially at right angle to the first and second directions and a pair of magnets respectively connected with said first and second magnetic members and said second and third magnetic members for generating magnetic flux in the magnetic gaps formed between said first and second magnetic members and between said second and third magnetic members.

11. An optical scanning system according to claim 10, wherein said first coil means is arranged around said second magnetic member to pass through said magnetic gaps.

12. An optical scanning system according to claim 10, wherein said second coil means includes a plurality of coils which are supported on said first coil means so that a portion of each of said plurality of coils is linked with said magnetic flux.

13. An optical scanning system according to claim 10, wherein said second magnetic member has a passage means therein for enabling a light beam forming the light spot to pass therethrough.

14. An optical scanning system for subjecting a light spot for tracking information on a predetermined recording medium to a focussing operation and a tracking operation, the optical scanning system comprising:

magnetic members for forming at least one magnetic gap extending substantially in a direction of said tracking operation and for generating magnetic flux in said magnetic gap in a direction substantially at right angles to both directions of the focusing operation and the tracking operation; and driving coil means including independently driven first coil means and second coil means for respectively performing the focusing operation and the tracking operation, both of said first and second coil means being placed in such a manner that a portion of each of said first and second coil means is linked with the magnetic flux in the magnetic gap, said driving coil means being supported by spring members through which electric current is supplied to said driving coil means, and wherein said first coil means includes a focussing coil which is wound in a plane which is substantially perpendicular to the direction of focussing.

15. An optical scanning system according to claim 14, further comprising an optical system for focussing said light spot on said recording medium, said optical system being supported by said driving coil means.

16. An optical scanning system according to claim 14, wherein said magnetic members include a first magnetic member, a second magnetic member, and a third magnetic member arranged with respect to one another in a direction substantially at right angles to the directions of the focussing and tracking operations and a pair of magnets respectively connected with both said first and second magnetic members and said second and third magnetic members for generating magnetic flux in the magnetic gap formed between the first and second magnetic members and between the second and third magnetic members.

17. An optical scanning system according to claim 16, wherein said first coil means is arranged around said second magnetic member to pass through said magnetic gap.

18. An optical scanning system according to claim 17, wherein said second coil means includes a plurality of coils which are supported on said first coil means so that a portion of each of said plurality of coils is linked with said magnetic flux.

19. An optical scanning system according to claim 16, wherein said second magnetic member includes a passage means for enabling a light beam forming the light spot to pass therethrough.

* * * * *